(12) United States Patent
Enzmann et al.

(10) Patent No.: US 6,687,242 B1
(45) Date of Patent: Feb. 3, 2004

(54) METHOD AND SYSTEM FOR PROVIDING ADDITIONAL INFORMATION TO A SUBSCRIBER BASED ON A UNIVERSAL RESOURCE LOCATOR

(75) Inventors: Mark J. Enzmann, Roswell, GA (US); Robert T. Moton, Jr., Alpharetta, GA (US); Samuel N. Zellner, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/468,884

(22) Filed: Dec. 22, 1999

(51) Int. Cl.[7] .............................................. H04L 12/66
(52) U.S. Cl. .................... 370/352; 370/474; 370/357; 370/389
(58) Field of Search ................................ 370/352, 329, 370/338; 379/114.01, 142.06, 142.01, 142.14, 142.15; 345/168; 455/414, 566, 415; 704/275; 709/210, 219, 245

(56) References Cited

U.S. PATENT DOCUMENTS

| | | | | |
|---|---|---|---|---|
| 5,724,412 A | * | 3/1998 | Srinivasan | 379/93.23 |
| 5,974,135 A | * | 10/1999 | Breneman et al. | 379/265.04 |
| 6,064,878 A | * | 5/2000 | Denker et al. | 455/415 |
| 6,141,413 A | * | 10/2000 | Waldner et al. | 379/88.17 |
| 6,192,218 B1 | * | 2/2001 | Laufmann et al. | 340/7.53 |
| 6,282,281 B1 | * | 8/2001 | Low | 379/230 |
| 2002/0072395 A1 | * | 6/2002 | Miramontes | 455/566 |
| 2002/0111154 A1 | * | 8/2002 | Eldering et al. | 455/414 |
| 2002/0111172 A1 | * | 8/2002 | DeWolf et al. | 455/456 |
| 2002/0131404 A1 | * | 9/2002 | Mehta et al. | 370/352 |
| 2002/0154745 A1 | * | 10/2002 | Shtivelman | 379/88.12 |

OTHER PUBLICATIONS

W@P White Paper/Wireless Application Protocol, Wireless Internet Today, Wireless Application Protocol Forum LTD., Jun. 1999.*

* cited by examiner

*Primary Examiner*—Ricky Ngo
*Assistant Examiner*—Jamal A. Fox
(74) *Attorney, Agent, or Firm*—Shaw Pittman LLP

(57) ABSTRACT

A system whereby subscribers are provided with a universal resource locator (URL), that uniquely identifies, e.g., a web site maintained by the calling party. In a preferred embodiment, when the telephone call-reaches the subscriber's handset, a special character, e.g., an "*" is added to the display, e.g., at the end of the calling party's telephone number to let the subscriber know that additional information is available. The subscriber can then obtain detailed information about the calling party by, e.g., pressing a special "send" button on the handset, using a softkey or entering a special code. This prompts the subscriber's handset to send a communication over the internet to a database. The database maintains a table associating calling parties' numbers with URLs. The URL database then links the subscriber's telephone to a website maintained by the calling party. The subscriber's handset then downloads the information stored on the calling party's website for display on the subscriber's handset.

24 Claims, 5 Drawing Sheets

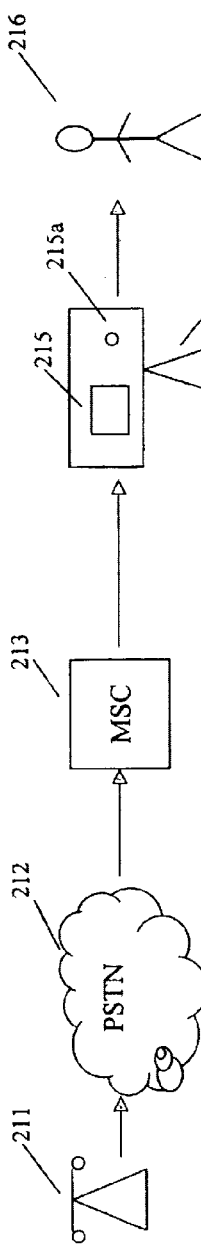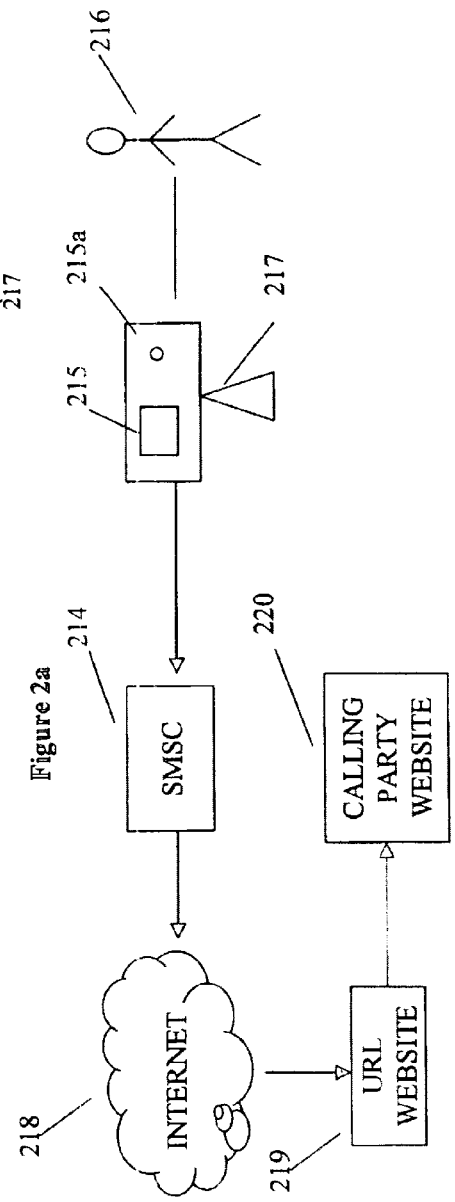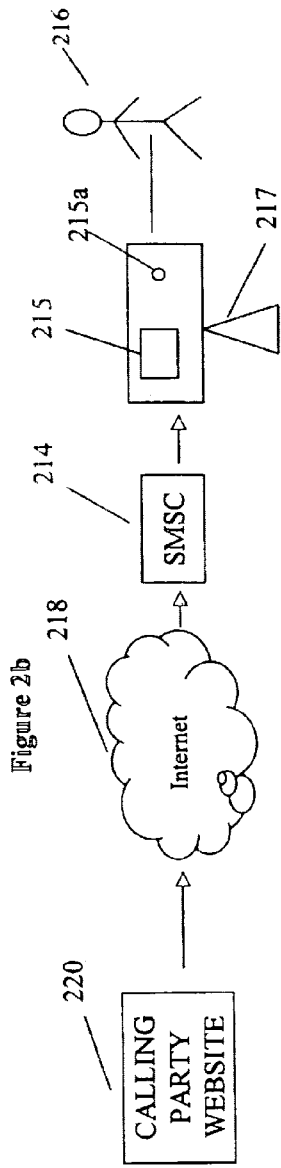
Figure 2a
Figure 2b
Figure 2c

EXAMPLE

METHOD AND SYSTEM FOR PROVIDING ADDITIONAL INFORMATION TO A SUBSCRIBER BASED ON A UNIVERSAL RESOURCE LOCATOR

BACKGROUND

1. Field of the Invention

The present invention relates generally to telecommunication systems and more particularly to a method and system for providing additional information associated with a calling party's telephone number.

2. Background of the Invention

Subscribers to telephone services often subscribe to services such as "caller ID" or "caller ID deluxe" that provide the subscriber with the telephone number or the name and telephone number, respectively, of the calling party. The telephone number and name of the calling party are usually shown on a display mounted on, or otherwise in communication with, the subscriber's telephone handset. An example of such a display is an LCD screen that displays one or more lines of information. Services such as caller ID or caller ID deluxe do not provide any way for the subscriber to receive any additional information that the calling party may want to provide to the subscriber.

SUMMARY OF THE INVENTION

The present invention provides subscribers with the ability to obtain additional information from the calling party. Subscribers to a service such as calling party ID are provided with a universal resource locator (URL), that uniquely identifies a web site or other information source maintained by the calling party.

In a preferred embodiment of the invention, when a telephone call reaches a subscriber's handset, the telephone network provides an indication that additional information could be provided upon request. For example, the number shown on the handset's caller ID display could include a special character, such as an "*" (or another indication such as underlining or blinking) that would serve as an indication that additional information could be available upon request. For example, the network might add the "*" at the end of the calling party's telephone number. The "*" (or the underlining or other indication) notifies the subscriber that the calling party has made additional information available. This additional information may be obtained preferably by accessing a website (or alternatively from another information source). Preferably, the handset is a "smartphone" or a "browser phone" such as a W@P handset (a handset that meets the standards of the W@P forum, described below). However, the present invention will work with any communication device that allows two-way communication, such as cellular telephones, two-way pagers, caller ID boxes with two-way capability, ISDN telephones, VOIP telephones and POTS telephones with browser capabilities.

In a preferred embodiment of the invention, the subscriber requests the additional information by using a softkey or entering a special code that initiates the service. Alternatively, the device may have a special hard key that initiates the service, in which case the subscriber just presses the special hard key on the handset to initiate the service. The request activates a program on the handset that initiates an internet protocol (IP) connection to, e.g., a web server or other database. Preferably, the program is a Java or Wireless Markup Language (WML) script program. The subscriber can initiate the request either while the telephone is ringing (before answering the call), during the call, while the number is displayed (if the handset can simultaneously support a voice call and an IP session), or recalling numbers of calling parties stored in the handset's memory after a call has been missed (and noting that certain calling party numbers have an "*" at the end of the number).

The program initiates a request from the handset through the wireless network and over the internet to a database. The request includes the calling party's number, and preferably also includes the called party's telephone number. The database maintains a table associating the telephone numbers of the calling parties' numbers with URLs, and will be referred to herein as the URL database. The subscriber's telephone is linked to the website identified by the URL associated with the calling party's number, which is maintained by the calling party. The website will be referred to herein as the calling party's website. At this point, the subscriber's handset is in communication with the calling party's website. The subscriber's handset then downloads the information stored on the calling party's website for display on the subscriber's handset.

When the request includes the subscriber's telephone number as well as the calling party's telephone number, the information downloaded to the subscriber could depend on the subscriber's telephone number. Either the database itself could screen data requests and send the requests to different websites (or to different pages on one website) depending on the subscriber's telephone number, or the website could send the request to different pages at the website depending on the subscriber's telephone number. For example, if the website is maintained by a construction company, it could be used to send one set of additional information to the company's engineers, another set to the contractors, and a third set to the suppliers. In another example, subscribers included in a list of telephone numbers stored at the website (e.g., the company's employees) could receive additional information that is different from the information that would be received by others.

Accordingly, the present invention provides calling parties with a fast and efficient method for providing additional information to subscribers using websites on the internet. It allows calling parties to add to, modify and/or delete the additional information independently of the telephone network. It also allows calling parties flexibility in selecting URLs and allows parties calling from several telephone numbers to use the same URL, instead of requiring the specific use of the calling party's telephone number as part of the URL. Furthermore, with the present invention, the subscribers may be directed to different URLs, depending on the subscriber's telephone number.

BRIEF DESCRIPTION OF THE DRAWINGS

FIG. 2a is a schematic diagram showing the call flow when a calling party makes a telephone call to a subscriber having a telephone handset with display.

FIG. 2b is a schematic diagram showing the call flow connecting the subscriber to the calling party's website.

FIG. 2c is a schematic diagram showing the call flow when the information stored on the calling party's website is downloaded to the subscriber.

DETAILED DESCRIPTION OF THE INVENTION

Figure 1:
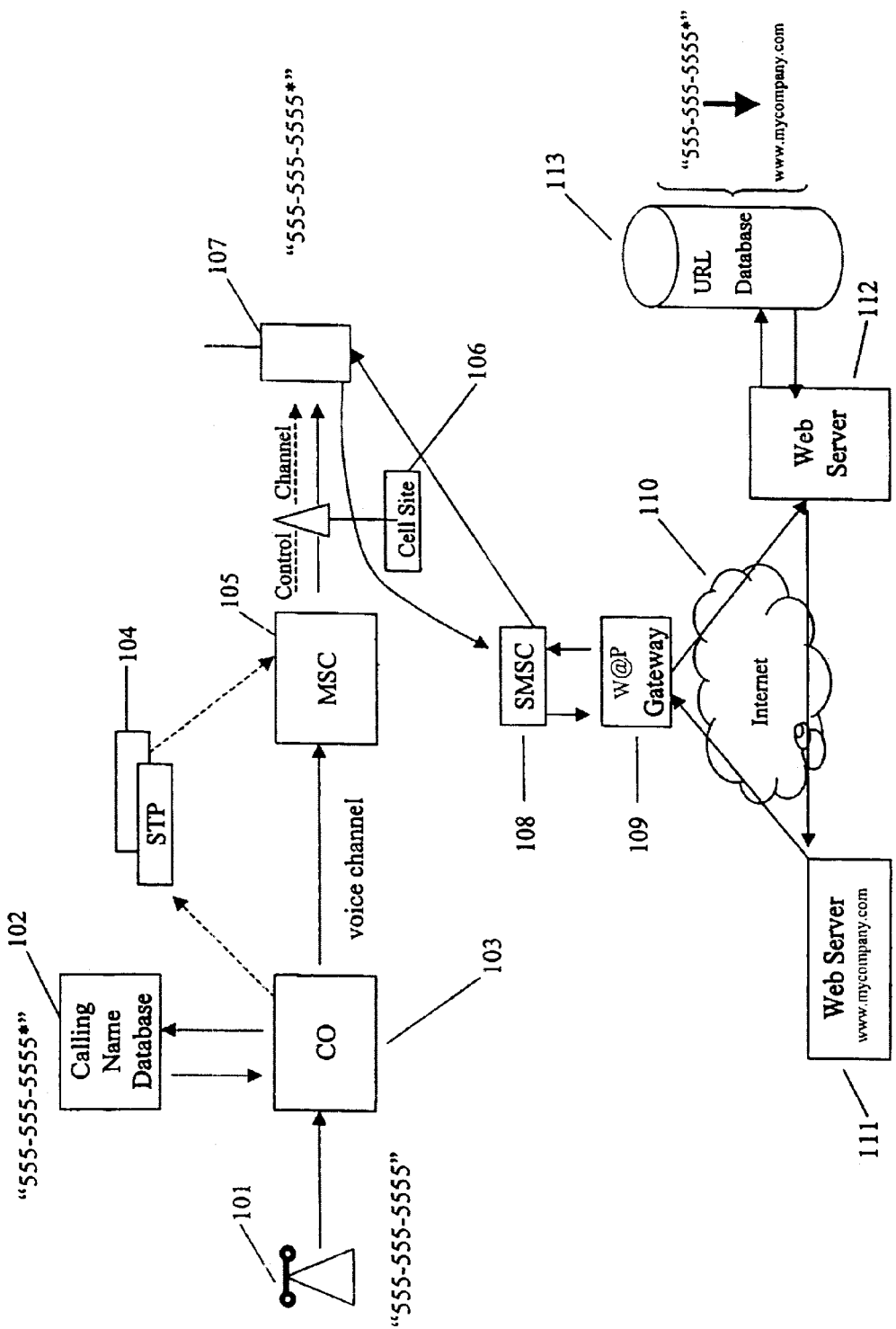
FIG. 1 is a schematic diagram of a preferred embodiment of the present invention.

FIG. 1 is a schematic diagram of a preferred embodiment of the present invention. A calling party uses her telephone 101 (that has, for example, the telephone number 555-555-5555) to place a call to a subscriber's communications device 107. Preferably, the communications device is a handset, but it could also be a computer, or a handset in communication with a computer or another device as explained herein. The call hits a trigger located in a central office 103 that serves the calling party's telephone 101. The trigger has been set by the central office 103 because the calling party has previously informed the central office that she would like to make additional information available to parties that she calls. The trigger prompts a query from central office 103 to a calling party name database 102. Database 102 alters the display characteristics of the calling party's telephone number, for example by adding a character, e.g., an "*",to the end of the calling party's telephone number and returns the telephone number with added character to the central office. The call is routed to handset 107 over a voice channel via Mobile Switching Center (MSC) 105 and cell site 106. The telephone number, with the character added at the end, is sent to handset 107 over a control channel via Signaling Transfer Point (STP) 104, MSC 105 and cell site 106, and is displayed on the subscriber's handset.

When the subscriber sees the character at the end of the telephone number, he knows that additional information associated with the calling party is available. If the subscriber requests that the additional information be delivered (by, for example, pressing a button or using a softkey or entering a special code), a browser on the handset establishes a communications link via cell site 106, SMSC (Short Messaging Service Center) 108, W@P gateway 109 and over internet 110 to web server 112. Web server 112 has a URL database, that associates the calling party's telephone number with the calling party's web server 111. In the example shown in FIG. 1, URL Database 113 includes an association of 555-555-5555* with www.mycompany.com. Web server 112, upon finding the entry in the URL database, re-directs the session to the calling party's web server 111, which, in this example, bears the name www.mycompany.com. If no entry is found, web server 112 defaults to a "no entry found" condition, and responds accordingly to the request from handset 107. As shown in FIG. 1, information can then be downloaded from the calling party's web server 111 over internet 110, via W@P gateway 109, SMSC 108 and cell site 106 to the subscriber's handset 107 over a second communications link. Instead of using an SMSC, such as SMSC 108, the present invention could also be implemented using other data bearers, including circuit-switched or packet-switched data communications.

FIG. 2a is a chart detailing the call flow to a person having a telephone handset that is equipped with a display. As shown in FIG. 2a, a calling party 211 places a call over Public-Switched Telephone Network (PSTN) 212 via Mobile Switching Center (MSC) 13 to a subscriber 216 using a handset 217 equipped with a display 215 and a send button 215a. As used herein, "handset" shall include wireless cellular telephones, personal data assistants and pagers and other devices that are capable of displaying caller ID data. All these devices provide a communications link between the handset and the network. "Handset" shall also include landline (such as ISDN lines) telephones, as well as laptop computers or desktop computers that can receive and respond to telephone calls.

The invention offers considerable flexibility in controlling the information that are displayed on the called party's handset display 215. For example, display 215 on subscriber's handset 217 shows the telephone number of the calling party—e.g., 555-555-5555—followed by a special character or code, e.g., a "*", at the end of the calling party's number as described above. Thus the entire display in this example would be 5555555555*. The special character at the end of the calling party's telephone number notifies the subscriber that additional information is available to the subscriber. As another example, calling name database 102 might provide a different calling party number, again containing an indication that additional information is available on request. In a further example, if additional information services become widely used, such that the subscriber can assume that additional information is possibly available for all incoming calls, the special character may no longer be needed. In that case, subscribers could enter the softkey (or press a button or use a special code) any time they believe that additional information might be available. If there is no additional information available, the URL database would then respond with a message indicating that no information is available.

In a preferred embodiment of the present invention, if the subscriber wishes to receive this additional information, the subscriber uses a softkey or enters a special code or presses send button 215a on handset 217 to request the additional information. As shown in FIG. 2b, handset 217 then sends the calling party's telephone number through SMSC 214 to internet 218, to reach URL database at website 219. (FIG. 2 refers to "websites" whereas FIG. 1 referred to "web servers." Essentially, a web server provides a website on the internet, i.e., there is a one-to-one correspondence of websites and web servers.) The database then looks up the URL corresponding to the calling party's telephone number, and links handset 217 to the calling party's website 220. Calling party website 220 is now in communication with handset 217 and display 215. As shown in FIG. 2c, information stored at the calling party's website is then downloaded from the calling party's website for display on display 215.

In a preferred embodiment of the invention, handset 217 is a Wireless Application Protocol ("W@P") handset, such as a cellular telephone, a pager, a personal digital assistant, or other wireless terminal. Standards and protocols for W@P communications are described in W@P Wireless Application Protocol, published by the W@P Forum, 2570 West El Camino Real, Suite 304, Mountain View, Calif., 94040, and in the W@P Wireless Application Protocol White Paper, published in the June 1999 issue of Wireless Internet Today, which are incorporated herein in their entirety. Copies of these documents are attached hereto as an Appendix to the application. Preferred W@P handset 217 reaches internet 218 via a W@P Gateway 109, which is an interface from the wireless system to the internet.

Figure 3A:
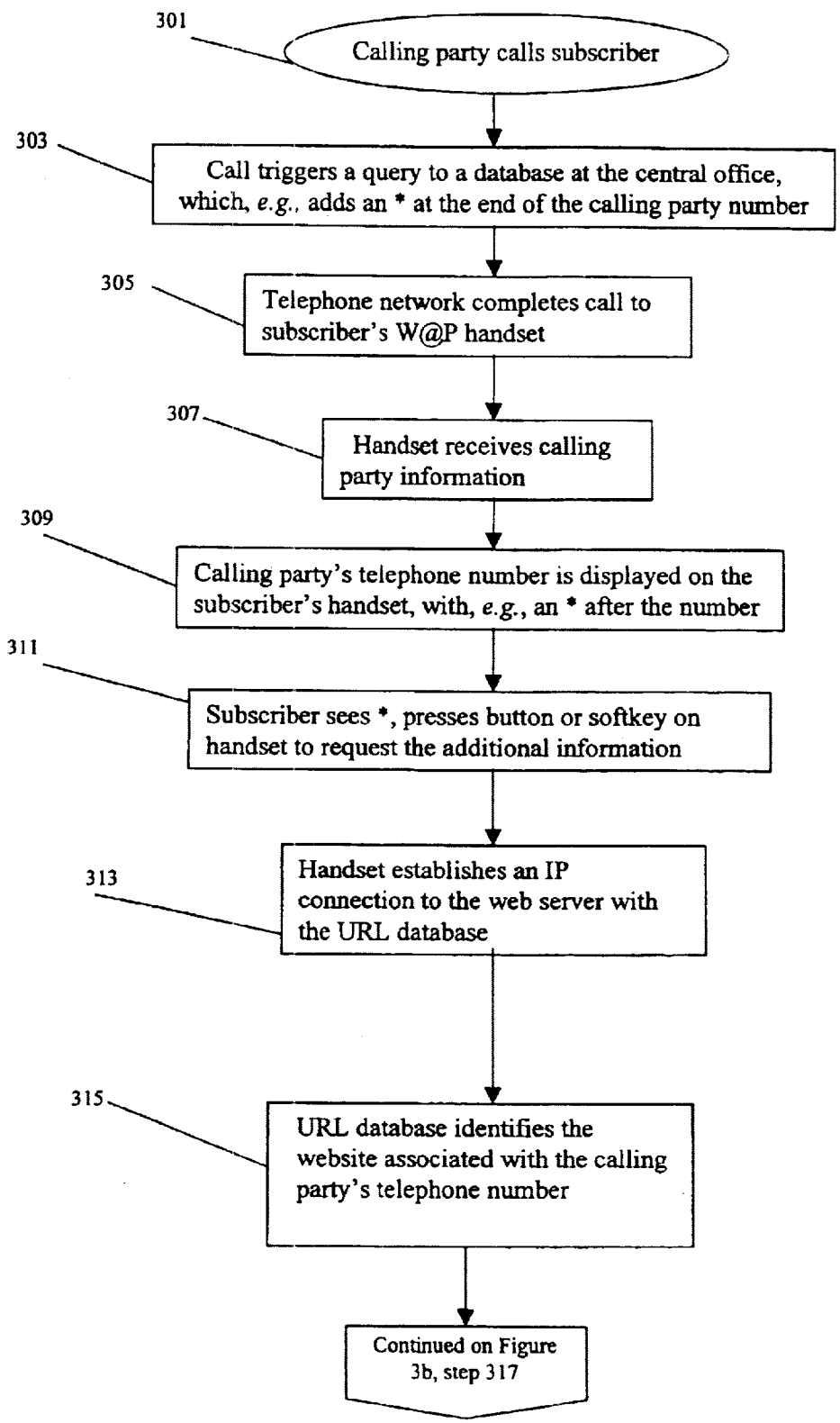
FIGS. 3a–3b show an example of steps that could be used to implement the present invention.
Figure 3B:
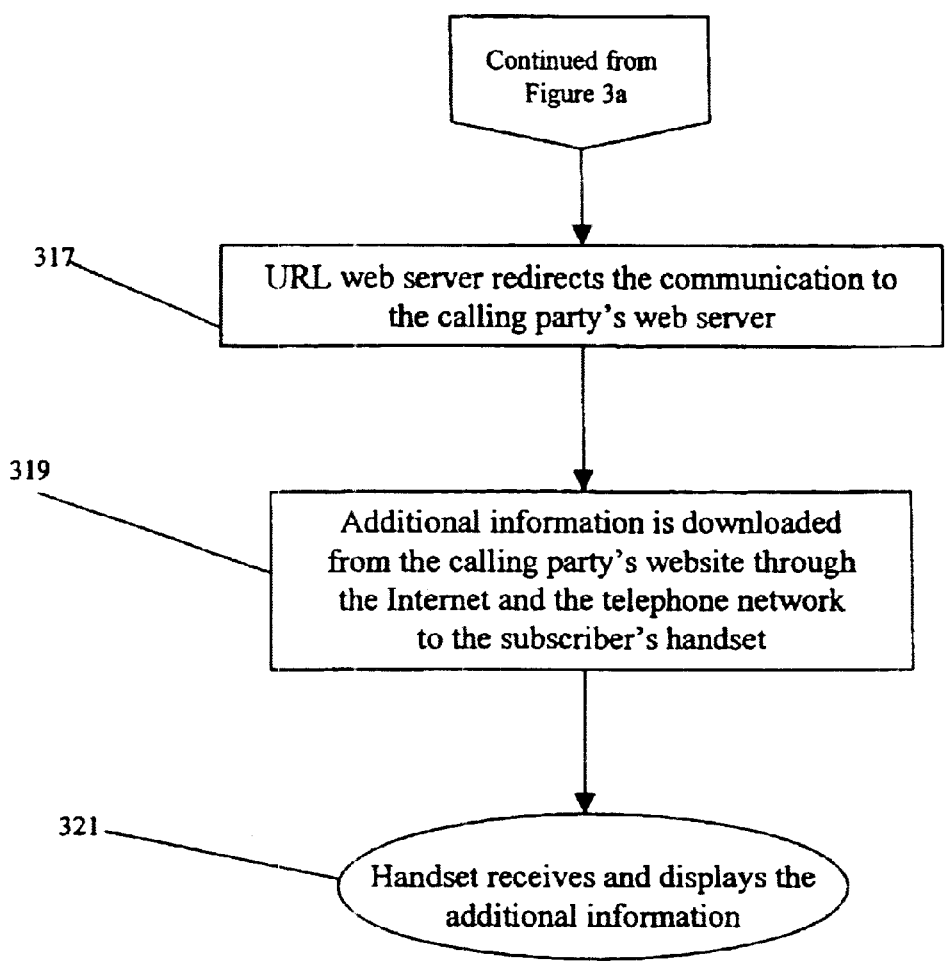
Figure 4:
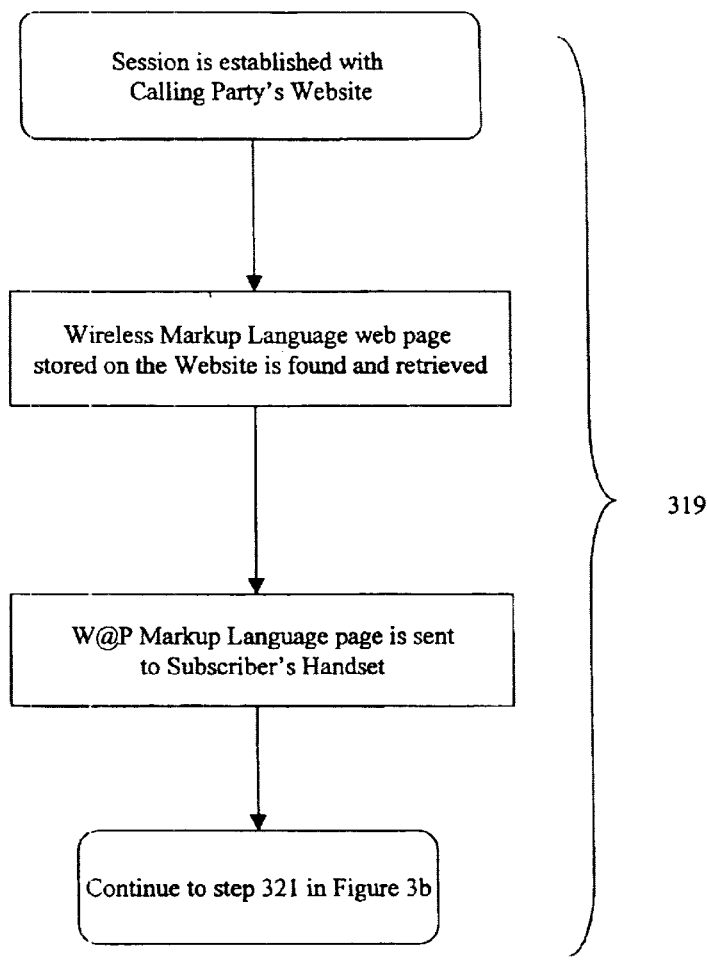
FIG. 4 is an example of steps for implementing step 319 of FIG. 3b.

FIGS. 3a–3b and FIG. 4 are examples of the steps that could be used to implement the present invention. In step 301, a calling party (that has additional information stored on a website) places a call to a subscriber who has a handset, e.g., a W@P handset, that can receive additional information from a website on the internet. In step 303, the call triggers a query to a database at the central office serving the calling party's telephone. In this example, the database adds a special character, e.g., an "*", to the calling party's number (e.g., at the end of the calling party's number), and returns the number to the central-office. In step 305, the telephone network completes the call to the subscriber's handset. In step 307, the handset receives information about the calling party, including the calling party's number with, e.g., an asterisk at the end of the number. In step 309, the calling party's number with (in this example) the asterisk at the end of the number is displayed on the subscriber's handset. In step 311, the subscriber presses a button or uses a softkey or enters a special code on the handset to request the additional information. In step 313, the handset establishes an IP communication channel over the internet to the web server on the internet with the URL database. In step 315, the URL database at URL website 219 identifies the website associated with the calling party's telephone number. In step 317, the communication is re-directed to the calling party's website. In step 319, additional information maintained by the calling party on its web server is downloaded over the internet and the telephone network to the subscriber's handset. In step 321, the subscriber receives the information on his or her handset.

FIG. 4 is an example of the steps that could be used to implement step 319. After the communication is established with the calling party's website, it is directed to a page on the website that complies with, e.g., the GOTO W@P or MicroBrowser protocol. The website then sends the additional information from the website to the subscriber's handset. Preferably, the information retrieved from the website is a message that is suitable for display on the handset display 215 (shown in FIGS. 2a–2c), and complies with the size and other limitations required by the handset and its display. For example, short messages could be shown in their entirety. Longer messages may have to be scrolled to be viewed on the display.

In a second preferred embodiment of the present invention, the handset is in communication with a computer, e.g., a laptop or desktop computer, and the information is downloaded through the handset to the computer. Alternatively, the handset is a laptop or desktop computer that can receive and respond to telephone calls.

The calling party has control over the information on the web site. For example, the calling party may direct the subscriber to a generic web site, intended to be accessed by the general public. Alternatively, the web site may be designed to be accessible only to subscribers who have been provided with the indication that additional information is available. For example, a marketing representative may call a number of prospective customers, and direct them to a specific web site designed for those specific customers. As another example, the head of a project may leave instructions for members of his team at a web site, and the members of his team could be directed to the website. The calling party websites may also require entry of personal identification numbers, a password or another special code, to ensure that only authorized persons may have access to the website.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A method for providing additional information from a calling party having a telephone number to a subscriber comprising:

providing the subscriber with the calling party's telephone number and an indication that an additional information is available upon request by the subscriber, wherein the indication is not associated with a website;

at the subscriber's request for the additional information to be delivered, linking the subscriber to a first website having a database, said database associating the calling party's telephone number with a second website having a universal resource locator;

linking the subscriber to the second website; and downloading the information from the second website to the subscriber.

2. The method of claim 1, wherein the subscriber receives the additional information on a handset.

3. The method of claim 2, wherein the handset comprises a send button, and wherein the subscriber requests the additional information by activating the send button.

4. The method of claim 2, wherein the subscriber requests the additional information by using a softkey.

5. The method of claim 2, wherein the handset is a handset that complies with the Wireless Application Protocol.

6. The method of claim 2, wherein the handset is a computer.

7. The method of claim 2, wherein the subscriber requests the additional information by entering a special code on the handset.

8. The method of claim 1, wherein the subscriber has a telephone number, and the second website is provided with the subscriber's telephone number, and the information downloaded from the second website depends in part on the subscriber's telephone number.

9. A system for providing additional information to a subscriber comprising:

a handset adapted to display a telephone number on a display;

an indication on the display indicating that additional information is available upon request by the subscriber wherein the indication is not associated with a website;

means for activating a request for delivering the additional information;

a first communications link from the handset to a database; said database associating the telephone number with a universal resource locator of a website containing additional information; and a second communications link from the website to the handset, wherein the additional information is downloaded from the website to the handset over the second communications link;

wherein the first communications link is activated by the request for delivering the additional information from the means for activating.

10. The system of claim 9, wherein the handset is a handset that complies with the Wireless Application Protocol.

11. The system of claim 9, wherein the handset is one of a wireless cellular telephone, a personal data assistant, and a pager.

12. The system of claim 9, wherein the system automatically links the website to the handset.

13. The system of claim 9, wherein the website requires entry of a personal identification number or passport before the additional information is downloaded from the website to the handset.

14. The system of claim 9, wherein the handset comprises a send button that the subscriber can press to activate the first communication link from the handset to the database.

15. The system of claim 9, wherein the first communications link from the handset to the database is activated by entry of a string of character.

16. A method for providing additional information to a subscriber's handset comprising:

provide an indication on the handset that additional information is available upon request by the subscriber, wherein the indication is not associated with a website;

allowing the subscriber to activate a request for delivering the additional information;

using a URL database to identify a website containing the additional information;

after a request for delivering the additional information is activated by the subscriber, linking the subscriber's handset to the website;

downloading the additional information into the subscriber's handset.

17. The method of claim 16, wherein the indication is a special character displayed on the subscriber's handset.

18. The method of claim 16, wherein the subscriber enters a special code to request the additional information.

19. The method of claim 16, wherein the subscriber presses a hard key to request the additional information.

20. The method of claim 16, wherein step(s) comprise activating a program that initiates an internet protocol connection to a URL database.

21. The method of claim 16, further comprising providing the subscriber's telephone number to the website, wherein the information to be downloaded to the subscriber's handset is selected according to the subscriber's telephone number.

22. The method of claim 16, wherein the subscriber may request the additional information before answering the handset while the handset is ringing, during the call, or after the call.

23. The method of claim 16, wherein the website is accessible to the general public.

24. The method of claim 16, wherein the website is only accessible to subscribers who have been provided with the indication that additional information is available.

* * * * *